(12) United States Patent
Richards et al.

(10) Patent No.: US 11,562,171 B2
(45) Date of Patent: Jan. 24, 2023

(54) INSTANCE SEGMENTATION BY INSTANCE LABEL FACTORIZATION

(71) Applicant: Osaro, San Francisco, CA (US)

(72) Inventors: William Richards, San Francisco, CA (US); Ben Goodrich, San Francisco, CA (US)

(73) Assignee: Osaro, San Francisco, CA (US)

( * ) Notice: Subject to any disclaimer, the term of this patent is extended or adjusted under 35 U.S.C. 154(b) by 229 days.

(21) Appl. No.: 16/724,124

(22) Filed: Dec. 20, 2019

(65) Prior Publication Data

US 2020/0202166 A1    Jun. 25, 2020

Related U.S. Application Data

(60) Provisional application No. 62/783,744, filed on Dec. 21, 2018.

(51) Int. Cl.
| | | |
|---|---|---|
| G06K 9/62 | (2022.01) | |
| G06F 16/583 | (2019.01) | |
| G06N 3/04 | (2006.01) | |
| G06N 3/08 | (2006.01) | |

(52) U.S. Cl.
CPC ....... *G06K 9/6226* (2013.01); *G06F 16/5854* (2019.01); *G06K 9/628* (2013.01); *G06K 9/6256* (2013.01); *G06K 9/6276* (2013.01); *G06N 3/0481* (2013.01); *G06N 3/08* (2013.01)

(58) Field of Classification Search
CPC .. G06K 9/6226; G06K 9/6276; G06K 9/6256; G06K 9/628; G06K 9/6262; G06K 9/6272; G06F 16/5854; G06N 3/0481; G06N 3/08; G06N 3/0454; G06N 3/084
See application file for complete search history.

(56) References Cited

U.S. PATENT DOCUMENTS

| | | | |
|---|---|---|---|
| 8,885,926 | B2 | 11/2014 | Seung |
| 9,317,781 | B2 | 4/2016 | Tu |
| 9,443,320 | B1 | 9/2016 | Gaidon |
| 9,830,529 | B2 | 11/2017 | Jetley |
| 9,978,003 | B2 | 5/2018 | Sachs |
| 10,019,631 | B2 | 7/2018 | Tao |
| 10,303,982 | B2 | 5/2019 | Cox |

(Continued)

FOREIGN PATENT DOCUMENTS

| | | |
|---|---|---|
| CN | 109409432 A | 3/2019 |
| WO | 2018170512 A1 | 9/2018 |
| WO | 2019015785 A1 | 1/2019 |
| WO | 2019099428 A1 | 5/2019 |
| WO | 2019135234 A1 | 7/2019 |

OTHER PUBLICATIONS

FCN for Semantic Segmentation, Long et al., 2015; https://arxiv.org/pdf/1411.4038.pdf (Year: 2015).*

(Continued)

*Primary Examiner* — Jianxun Yang
(74) *Attorney, Agent, or Firm* — Blueshift IP, LLC; Robert Plotkin

(57) ABSTRACT

A computer system trains a neural network on an instance segmentation task by casting the problem as one of mapping each pixel to a probability distribution over arbitrary instance labels. This simplifies both the training and inference problems, because the formulation is end-to-end trainable and requires no post-processing to extract maximum a posteriori estimates of the instance labels.

18 Claims, 2 Drawing Sheets

(56) References Cited

U.S. PATENT DOCUMENTS

| | | |
|---|---|---|
| 2018/0108137 A1 | 4/2018 | Price |
| 2018/0211157 A1* | 7/2018 | Liu .................... G06T 3/4046 |
| 2019/0012802 A1 | 1/2019 | Liu |
| 2019/0057507 A1 | 2/2019 | El-Khamy |
| 2019/0147320 A1 | 5/2019 | Mattyus |
| 2019/0171903 A1 | 6/2019 | Vajda |
| 2019/0213443 A1 | 7/2019 | Cunningham |
| 2019/0236413 A1 | 8/2019 | Cox |

OTHER PUBLICATIONS

Segmentation from natural language, Hu et al, 2016; https://arxiv.org/pdf/1603.06180.pdf (Year: 2016).*

Brabandere, B.D., et al., "Semantic Instance Segmentation with a Discriminative Loss Function," Computer Science, arXiv:1708.02551v1, pp. 1-10 (Aug. 8, 2017).

Fathi, A., et al., "Semantic Instance Segmentation via Deep Metric Learning," Computer Vision and Pattern Recognition, arXiv:1703.10277v1, pp. 1-9 (Mar. 30, 2017).

He, K., et al., "Mask R-CNN," Computer Science—Computer Vision and Pattern Recognition, arXiv:1703.06870v3 [cs.CV], pp. 1-12 (Jan. 24, 2018).

Kong, S., et al., "Recurrent Pixel Embedding for Instance Grouping," The IEEE Conference on Computer Vision and Pattern Recognition (CVPR), pp. 9018-9028 (2018).

Neven, D., et al., "Instance Segmentation by Jointly Optimizing Spatial Embeddings and Clustering Bandwidth," Computer Vision and Pattern Recognition, arXiv:1906.11109v2, pp. 1-9 (Aug. 2, 2019).

Novotny, D., et al., "Semi-convolutional Operators for Instance Segmentation," The European Conference on Computer Vision (ECCV), pp. 1-17 (2018).

\* cited by examiner

INSTANCE SEGMENTATION BY INSTANCE LABEL FACTORIZATION

BACKGROUND

"Instance segmentation" refers to the task of decomposing an image into regions corresponding to individual objects in the image. Instance segmentation can be posed as a labeling problem where each pixel in an image must be mapped to one or many of a multitude of labels, each of which corresponds to an individual object in the scene. Instance segmentation is distinguished from semantic segmentation, a related task, in that instance segmentation maps different labels to different instances of a single class of object (e.g., two coffee cups in an image would have different labels), whereas semantic segmentation classifies pixels into different categories of objects (e.g., two coffee cups would receive the same label).

Various techniques for performing instance segmentation are well-known. For example, some existing instance segmentation algorithms use neural networks. Examples of neural network-based approaches to instance segmentation include those which employ proposal-based methods (such as Mask-RCNN, described in "Mass R-CNN," Kaiming He et al., available online at https://arxiv.org/abs/1703.06870) and those which train a neural network to map the image into an embedding space. (Examples of embedding space approaches include, for example, "Semantic Instance Segmentation via Deep Metric Learning" (available online at https://arxiv.org/pdf/1703.10277.pdf), "Semantic Instance Segmentation with a Discriminative Loss Function" (available online at https://arxiv.org/pdf/1708.02551.pdf), "Recurrent Pixel Embedding for Instance Grouping" (available online at http://openaccess.thecvf.com/content_cvpr_2018/papers/Kong_Recurrent_Pixel_Embedding_CVPS_2018_paper.pdf), and "Semi-convolutional Operators for Instance Segmentation" (available online at https://arxiv.org/pdf/1807.10712.pdf).

Proposal-based methods suffer from increased complexity due to their multistage nature, as well as due to ambiguities in the task for the second stage in cases in which a bounding box contains multiple instances which have roughly the same extents. Pixels mapped to an embedding space must later be clustered into instances, which is computationally expensive and difficult to train end-to-end, especially for high-dimensional embedding spaces required for images with many instances.

What is needed, therefore, are improved techniques for performing instance segmentation.

SUMMARY

A computer system trains a neural network on an instance segmentation task by mapping each pixel to a categorical probability distribution p over arbitrary instance labels, minimizing a loss function that is permutation-invariant with respect to the predicted labels. The trained neural network is trained to produce the same label for pixels corresponding to the same instance, and different labels for pixels corresponding to different instances, without specifying which label should be produced for a given pixel. The neural network may be trained to minimize a loss function after applying a minimum-loss mapping g from neural network labels to ground truth labels, or by minimizing the divergence of permutation-invariant auxiliary distributions derived from the ground truth and network distributions (e.g., that two pixels share the same label). This formulation simplifies both the training and inference problems compared to existing approaches, because the system is end-to-end trainable and requires no post-processing to extract maximum a posteriori (MAP) estimates of the instance labels.

Other features and advantages of various aspects and embodiments of the present invention will become apparent from the following description and from the claims.

DETAILED DESCRIPTION

Embodiments of the present invention are directed to a computer system which trains a neural network on an instance segmentation task by casting the problem as one of mapping each pixel to a probability distribution over arbitrary instance labels. This simplifies both the training and inference problems, because the formulation is end-to-end trainable and requires no post-processing to extract maximum a posteriori estimates of the instance labels.

Figure 1:
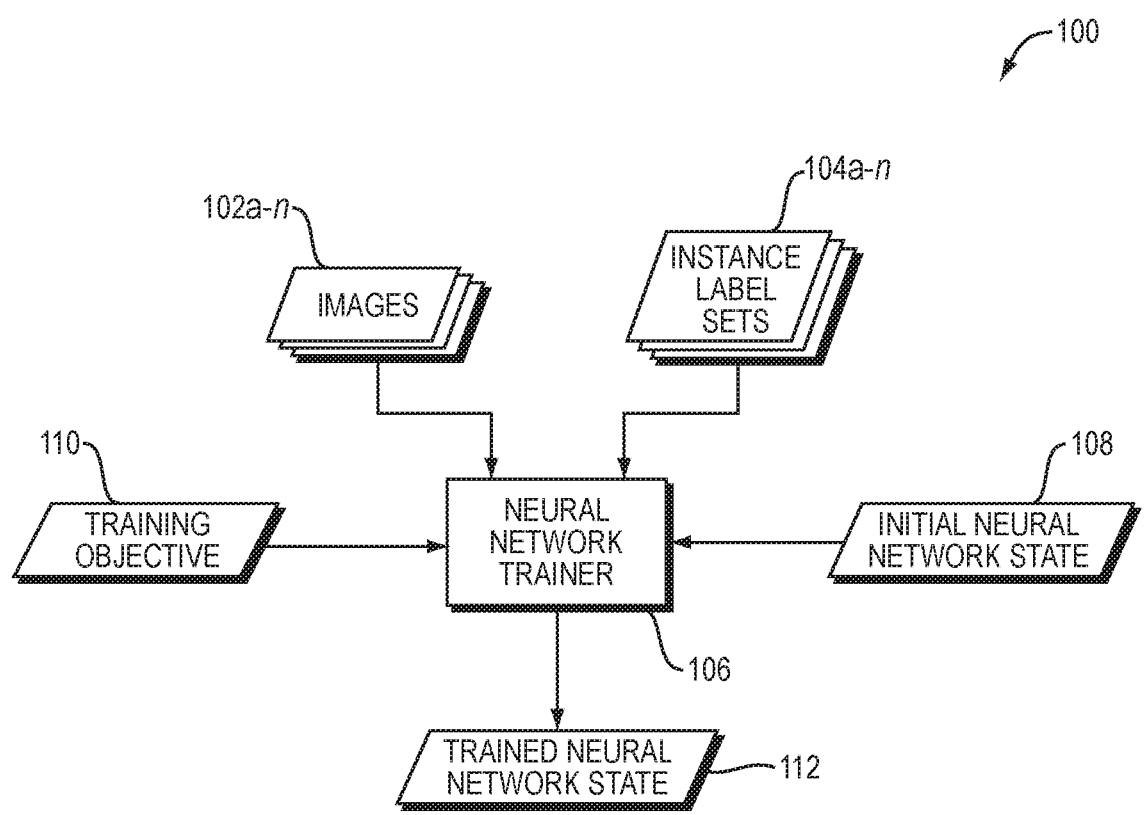
FIG. 1 is a dataflow diagram of a system for performing instance segmentation according to one embodiment of the present invention.
Figure 2:
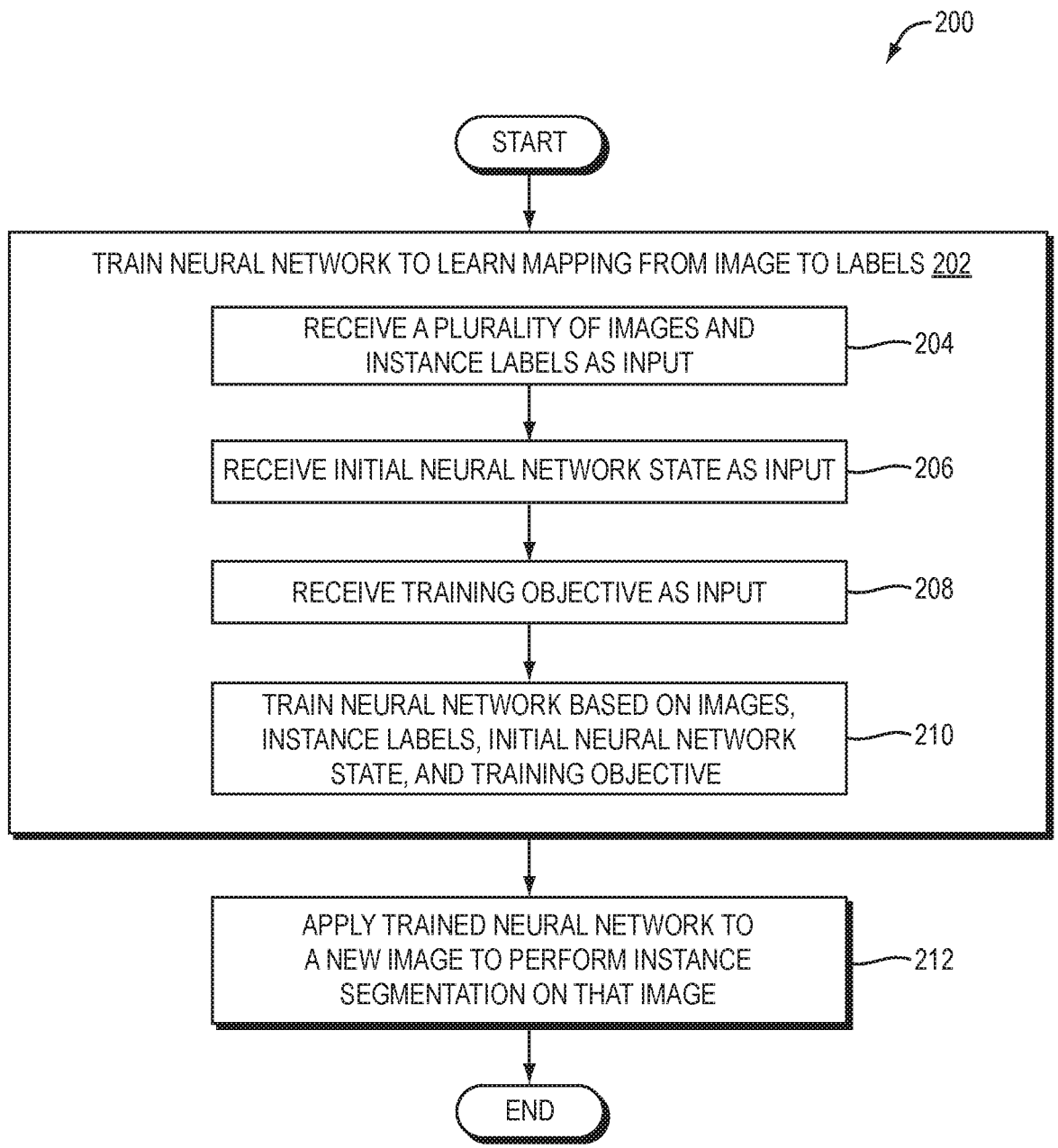
FIG. 2 is a flowchart of a method performed by the system of FIG. 1 according to one embodiment of the present invention.

Referring to FIG. 1, a dataflow diagram is shown of a system 100 for performing instance segmentation according to one embodiment of the present invention. Referring to FIG. 2, a flowchart is shown of a method 200 performed by the system 100 of FIG. 1 according to one embodiment of the present invention.

The system 100 of FIG. 1 includes an artificial neural network (ANN) (also referred to herein simply as a "neural network"), which begins in an initial (e.g., untrained) state 108. Such a neural network may, for example, be a Fully Convolutional Neural Network which is configured to directly output a probability distribution by using a Softmax activation. A neural network such as this is merely one example, however, and does not constitute a limitation of the present invention. The neural network of FIG. 1 may be any kind of neural network; embodiments of the present invention are not limited to use in connection with any particular kind of neural network. As a result, the initial state 108 may be any kind of neural network state.

Furthermore, although the state 108 is referred to herein as an "initial" state, this merely means that the state 108 is a state of the neural network before the training of FIGS. 1 and 2 has been performed. The initial state 108 need not be "initial" in the sense of being completely untrained; it may, for example, be the result of some other training.

In general, the system 100 of FIG. 1 uses a neural network training module 106 to train the neural network (i.e., transform the initial neural network state 108 into a trained neural network state 112) to perform the mapping $f: I \rightarrow L$ from an image I to a distribution of instance labels L over the pixels in the image I (FIG. 2, operation 202). The output of the trained network L approximates a set of ground truth instance labels T after a label permutation operation g, i.e., $g(T) \cong L$. The image I may be any kind of image or some representation, e.g., an image of any size, resolution, color, depth map over a scene, etc., or any combination of images. The image I may include any number of pixels, which may represent any number of instances of any number of classes. For example, the image I may include a first subset of pixels representing a first instance of a first class and a second subset of pixels representing a second instance of the first class. The image I may, additionally or alternatively, include a third subset of pixels representing a first instance of a second class. The image I may, additionally or alternatively, include a fourth subset of pixels representing a second instance of the second class. These are merely examples which illustrate that the image I may include pixels representing any number of instances of any number of classes. Embodiments of the present invention may be used to perform the mapping f:I→L on any number of images I, which may differ from each other in any of a variety of ways. Any reference herein to an instance in an image should be understood to refer to one or a plurality of pixels, in the image, which represent the instance.

Assume that an image has a height H and a width W (both measured in pixels). The training module 106 enforces that the predicted distribution of instance labels L factorizes as the product of H×W independent categorical pixel label distributions $p_i$ (one for each pixel in the image) over N instance labels, where N>1, and wherein N may be much larger than the number of instances within the image (i.e., that the pixel label distributions are independent, conditioned on I). Each pixel label distribution $p_i$ specifies, for each of the N instance labels L, a corresponding probability that pixel i represents the instance that is labeled by that instance label.

For notational convenience, we will assume that each distribution $p_i$ has category probabilities parameterized by a corresponding vector $p_i$. The categorical predicted label distributions $p_i$ are produced directly by the artificial neural network. In one embodiment of the present invention, the outputs of the artificial neural network are ensured to have the properties of a categorical distribution over N categories by applying a pixel-wise softmax activation layer on a neural network output feature volume containing N channels. From these probability distributions, the MAP labels may be directly obtained by performing an arg-max operation.

The neural network training module 106 receives as input a plurality of images 102a-n and a plurality of corresponding sets of ground truth instance labels 104a-n (referred to herein collectively as T), where n may be any non-zero integer (FIG. 2, operation 204). For example, instance label set 104a may correspond to image 102a, instance label set 104b may correspond to image 102b, instance label set 104c may correspond to image 102c, and so on. Each of the instance label sets 104a-n may contain any number of instance labels corresponding to instances in the corresponding one of the images 102a-n. Different instance labels sets 104a-n may contain the same or different numbers of instance labels than each other.

In general, an instance label in an instance label set corresponds to an instance in the image that corresponds to the instance label set. For example, a first instance label set that corresponds to a first image may include an instance label A that corresponds to a plurality of pixels representing an instance A in the first image, and may further include an instance label B that corresponds to a plurality of pixels representing an instance B in the first image. Similarly, a second instance label set that corresponds to a second image may include an instance label C that corresponds to a plurality of pixels representing an instance C in the second image, and may further include an instance label D that corresponds to a plurality of pixels representing an instance D in the second image. These are merely particular examples. More generally, any instance label set may include any number of instance labels corresponding to any number of instances in the image that corresponds to the instance label set.

The term "instance," as used herein, refers to a subset of the pixels in an image, where that subset of pixels represents a particular instance of a class. Any instance may include one or more pixels. For example, assume that a first class is a class of coffee cups and that a second class is a class of dishes. A first image may include a first instance of the first class (e.g., a first subset of pixels in the first image) that represents a first coffee cup in the first image. The first image may include a second instance of the first class (e.g., a second subset of pixels in the first image) that represents a second coffee cup in the first image. Similarly, the first image may include a first instance of the second class (e.g., a third subset of pixels in the first image) that represents a first dish in the first image. The first image may include a second instance of the second class (e.g., a fourth subset of pixels in the first image) that represents a second dish in the first image. These are merely particular examples. More generally, any image may include any number of instances of any number of classes.

The neural network training module 106 also receives as input the initial neural network state 108 and a training objective 110 (FIG. 2, operations 206 and 208). In some embodiments of the present invention, for any pair of pixels (i, j), the training objective 110 is formulated by considering an auxiliary probability distribution: the probability that two samples drawn from any two pixel label distributions $p_i$ and $p_j$ (corresponding to any two pixels i and j in a particular image I, respectively) share the same instance label in the set of instance labels L (i.e., predicted pixel label similarity), which is given by $P(i,j)=p_i \cdot p_j$. The training objective specifies that the divergence between P and the pixel label similarity derived from the instance labels T (herein referred to as Q) should be minimized.

Embodiments of the present invention may make various assumptions about the quality of the ground truth labels, and thus about the particular form of the function Q. As an illustration of the method, for the case of perfect labels the ground truth similarity function Q may be defined as Q(i,j)=1 iff pixels i and j correspond to the same instance according to the ground truth instance labels T (FIG. 1), otherwise Q(i,j)=0. Ultimately, the goal of the training objective 110 is to learn a per-pixel categorical distribution such that the similarity between pixels i and j, P(i,j), is close to 1.0 if pixels i and j belong to the same instance according to T. For the special case of using the Kullback-Liebler divergence and making this assumption of perfect ground truth labels, this loss simplifies to:

$$KL(Q|P) = \begin{cases} \log(p_i \cdot p_j) & q_i = q_j \\ \log(1 - p_i \cdot p_j) & q_i \neq q_j \end{cases}$$

where the cases depend on whether pixels i and j were drawn from the same or different instances, and $q_i$ is the instance label for pixel i according to T.

The only remaining hyperparameter in the training objective 110 is the sampling strategy for pixels i and j; embodiments of the present invention may use any sampling strategy. In the case where the neural network is able to perfectly learn f, the KL divergence will be 0 for any sampling strategy and thus choice does not matter. When f is not perfectly learnable, the sampling strategy affects how the loss is weighted across different pixel pairs.

In other embodiments of the present invention, the inefficiencies of pairwise sampling are avoided by constructing a loss function which minimizes the divergence between the output label distribution of the labels that are output by the neural network and the ground truth labels directly. The minimum-loss mapping g of ground truth instance labels T to model predictions L is determined during the forward pass, and the loss gradient is backpropagated through this mapping to perform the neural network update. The mapping g is restricted to be an injective function of ground truth classes onto the classes predicted by the model. To find such a mapping, an N by K cost matrix C is constructed where each element C[i,j] accumulates the loss due to the j-th labeled instance being assigned to the i-th model output class. For any mapping g of the K instances to the N labels, the total loss may be calculated by $$\mathcal{L} = \sum_{j=0}^{K} C[g(j), j].$$

In these embodiments of the present invention, a training objective is used which considers all one-to-one mappings between the K instances and a subset of the N labels.

Finding the minimum cost mapping is then equivalent to the linear assignment problem and any of a variety of known linear assignment algorithms may be used; each row must be assigned to each column, or each instance must be assigned to each label in a way that minimizes cost. Note that although the linear assignment algorithm is not differentiable, the assignments themselves are selected as targets for the loss function and the network is fully differentiable through g. The loss function may be chosen to calculate the cross-entropy between the labels and instances as selected by the linear assignment algorithm. For the case of perfect labels, this is equivalent to maximizing the log-likelihood of the labels after applying g to the network outputs.

The neural network training module 106 may perform training, thereby producing the trained neural network state 112 based on the images 102a-n, the instance labels 104a-n, the initial neural network state 108, and the training objective 110 using any of a variety of known neural network training techniques (FIG. 2, operation 210). As is well-known to those having ordinary skill in the art, the trained neural network state 112 may include, for example, a set of weights that result from the training performed by the training module 106.

The techniques disclosed herein are applicable to any measure of information divergence. Furthermore, the techniques disclosed herein may incorporate any of a variety of assumptions about the uncertainty associated with the ground truth labels through the form of the ground truth label similarity function Q or losses used to form the cost matrix C.

Once the neural network has been trained in the manner described above, the trained neural network may be applied to an image (whether or not that image was in the training set of images 102a-n) to perform instance segmentation on that image (i.e., to output a categorical distribution over class instances for each pixel in the image, also referred to herein as a "class instance probability distribution" for that image) (FIG. 2, operation 212). Embodiments of the present invention may apply the trained neural network in this way to any number of images.

Embodiments of the present invention have advantages of speed and simplicity in comparison with previous approaches for performing instance segmentation. As described above, proposal-based approaches (such as Mask-RCNN) rely on a complex architecture which must propose the location of an object (via placing bounding boxes) and use a second stage to define an instance segmentation mask within the proposed bounding box. In contrast, embodiments of the present invention may use a trained neural network to output class instance probabilities directly.

In embedding space approaches, the network outputs a vector that it has learned to cluster together for embeddings that belong to the same instance. Such inferences are difficult to make because doing so relies on clustering the embeddings. Such clustering can be error-prone, because the number of instances over which embedding is performed is not known. Furthermore, such clustering can be slow because there may be a large number of embeddings to cluster over, and to accommodate segmentation of many instances must occupy a high-dimensional space. In contrast, embodiments of the present invention use a neural network to output instance probabilities directly, which is both faster and simpler than embedding space approaches.

Certain embodiments of the present invention are directed to a method for training an artificial neural network. The method may be performed by at least one computer processor executing computer program instructions stored on at least one non-transitory computer-readable medium. The method may include: (A) receiving a plurality of images and a plurality of sets of corresponding instance labels; (B) receiving and/or generating a training objective, wherein the training objective specifies that a divergence of a probability that a first sample and a second sample correspond to the same instance label as each other in the plurality of sets of corresponding instance labels is to be minimized, wherein: the first sample corresponds to a first pixel in an image; a first pixel label distribution comprises the first sample; the second sample corresponds to a second pixel in the image; a second pixel label distribution comprises the second sample; and (C) training the artificial neural network based on the plurality of images, the plurality of sets of corresponding instance labels, and the training objective.

The method may further include: (D) applying the artificial neural network, after the training, to a particular image comprising a plurality of pixels, to produce a categorical probability distribution of the plurality of pixels over a plurality of instance labels. The categorical probability distribution may map a first one of the plurality of pixels to a first instance of a first class and map a second one of the plurality of pixels to a second instance of the first class. The categorical probability distribution may map a first one of the plurality of pixels to a first instance of a first class and map a second one of the plurality of pixels to a first instance of a second class.

Training the artificial neural network may include training the artificial neural network to minimize a loss function after applying a minimum-loss mapping from neural network labels to ground truth labels. Training the artificial neural network may include training the artificial neural network by minimizing a divergence of permutation-invariant auxiliary distributions derived from the ground truth labels and network distributions.

The artificial neural network may be a Fully Convolutional Neural Network. The Fully Convolutional Neural Network may be configured to directly output a probability distribution by using a Softmax activation.

Training the artificial neural network may enforce that L factorizes as the product of H×W independent categorical distributions $p_i$ over N instance labels.

Other embodiments of the present invention are directed to a method for training an artificial neural network, performed by at least one computer processor executing computer program instructions stored on at least one non-transitory computer-readable medium. The method includes: (A) receiving a plurality of images and a plurality of sets of corresponding ground truth instance labels; (B) receiving a training objective, wherein the training objective specifies to minimize, for each pixel in an image, a divergence between (1) a distribution over instance labels produced by the artificial neural network and (2) a distribution resulting from applying an injective mapping of ground truth instance labels to neural network output labels to the distribution over instance labels determined from the corresponding ground truth instance labels, wherein the injective mapping is chosen for each image at every update step to minimize the divergence between (1) and (2); and (C) training the artificial neural network based on the plurality of images, the plurality of sets of corresponding ground truth instance labels, and the training objective.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, the neural networks used by embodiments of the present invention may be applied to datasets containing millions of elements and perform up to millions of calculations per second. It would not be feasible for such algorithms to be executed manually or mentally by a human. Furthermore, it would not be possible for a human to apply the results of such learning to control a robot in real time.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method for training an artificial neural network, performed by at least one computer processor executing computer program instructions stored on at lea one non-transitory computer-readable medium, the method comprising:
   (A) receiving a plurality of images and a plurality of sets of corresponding ground truth instance labels, wherein each of the ground truth instance labels associates a region of an image with a specific instance of an object;
   (B) receiving a training objective, wherein the training objective specifies that a divergence of a probability that a first sample and a second sample correspond to the same instance label as each other in the plurality of sets of corresponding ground truth instance labels is to be minimized, wherein:
      the first sample corresponds to a first pixel in an image;
      a first pixel label distribution comprises the first sample;
      the second sample corresponds to a second pixel in the image;
      a second pixel label distribution comprises the second sample; and
   (C) training the artificial neural network to minimize a loss function based on the plurality of images, the plurality of sets of corresponding ground truth instance labels, and the training objective, comprising:
      determining an injective mapping g from ground truth instance labels T onto labels L predicted by the artificial neural network to minimize loss of the artificial neural network;
      applying the injective mapping g during a forward pass of the artificial neural network, wherein the loss function after applying the injective mapping is permutation-invariant with respect to the labels L predicted by the artificial neural network; and
      backpropagating a loss gradient through the injective mapping g to update the artificial neural network.

2. The method of claim 1, further comprising:
   (D) applying the artificial neural network, after the training, to a particular image comprising a plurality of pixels, to produce a categorical probability distribution of the plurality of pixels over a plurality of instance labels.

3. The method of claim 2, wherein the categorical probability distribution maps a first one of the plurality of pixels to a first instance of a first class and maps a second one of the plurality of pixels to a second instance of the first class.

4. The method of claim 2, wherein the categorical probability distribution maps a first one of the plurality of pixels to a first instance of a first class and maps a second one of the plurality of pixels to a first instance of a second class.

5. The method of claim 1, wherein (C) comprises training the artificial neural network by minimizing a divergence of permutation-invariant auxiliary distributions derived from the ground truth instance labels and network distributions.

6. The method of claim 1, wherein the artificial neural network comprises a Fully Convolutional Neural Network.

7. The method of claim 6, wherein the Fully Convolutional Neural Network is configured to directly output a probability distribution by using a Softmax activation.

8. The method of claim 1, wherein the training in (C) enforces that L, the probability distribution over N instance labels, factorizes over H×W independent categorical distributions.

9. A system for training an artificial neural network, the system comprising at least one non-transitory computer-readable medium comprising computer program instructions executable by at least one computer processor to perform a method, the method comprising:
   (A) receiving a plurality of images and a plurality of sets of corresponding ground truth instance labels, wherein each of the ground truth instance labels associates a region of an image with a specific instance of an object;
   (B) receiving a training objective, wherein the training objective specifies that a divergence of a probability that a first sample and a second sample correspond to the same instance label as each other in the plurality of sets of corresponding ground truth instance labels is to be minimized, wherein:
      the first sample corresponds to a first pixel in an image;
      a first pixel label distribution comprises the first sample;
      the second sample corresponds to a second pixel in the image;
      a second pixel label distribution comprises the second sample; and
   (C) training the artificial neural network to minimize a loss function based on the plurality of images, the plurality of sets of corresponding ground truth instance labels, and the training objective, comprising:
      determining an injective mapping g from ground truth instance labels T onto labels L predicted by the artificial neural network to minimize loss of the artificial neural network;
      applying the injective mapping g during a forward pass of the artificial neural network, wherein the loss function after applying the injective mapping is permutation-invariant with respect to the labels L predicted by the artificial neural network; and
      backpropagating a loss gradient through the injective mapping g to update the artificial neural network.

10. The system of claim 9, wherein the method further comprises:
    (D) applying the artificial neural network, after the training, to a particular image comprising a plurality of pixels, to produce a categorical probability distribution of the plurality of pixels over a plurality of instance labels.

11. The system of claim 10, wherein the categorical probability distribution maps a first one of the plurality of pixels to a first instance of a first class and maps a second one of the plurality of pixels to a second instance of the first class.

12. The system of claim 10, wherein the categorical probability distribution maps a first one of the plurality of pixels to a first instance of a first class and maps a second one of the plurality of pixels to a first instance of a second class.

13. The system of claim 9, wherein (C) comprises training the artificial neural network by minimizing a divergence of permutation-invariant auxiliary distributions derived from the ground truth instance labels and network distributions.

14. The system of claim 9, wherein the artificial neural network comprises a Fully Convolutional Neural Network.

15. The system of claim 14, wherein the Fully Convolutional Neural Network is configured to directly output a probability distribution by using a Softmax activation.

16. The system of claim 9, wherein the training in (C) enforces that L, the probability distribution over N instance labels, factorizes as the product of H×W independent categorical distributions.

17. A method for training an artificial neural network, performed by at least one computer processor executing computer program instructions stored on at least one non-transitory computer-readable medium, the method comprising:
- (A) receiving a plurality of images and a plurality of sets of corresponding ground truth instance labels, wherein each of the ground truth instance labels associates a region of an image with a specific instance of an object;
- (B) receiving a training objective, wherein the training objective specifies to minimize, for each pixel in an image, a divergence between (1) a distribution over instance labels produced by the artificial neural network and (2) a distribution resulting from applying an injective mapping of ground truth instance labels to neural network output labels to the distribution over instance labels determined from the corresponding ground truth instance labels, wherein the injective mapping is chosen for each image at every update step to minimize the divergence between (1) and (2); and
- (C) training the artificial neural network to minimize a loss function based on the plurality of images, the plurality of sets of corresponding ground truth instance labels, and the training objective, comprising:
  - determining an injective mapping g from ground truth instance labels T onto labels L predicted by the artificial neural network to minimize loss of the artificial neural network;
  - applying the injective mapping g during a forward pass of the artificial neural network, wherein the loss function after applying the injective mapping is permutation-invariant with respect to the labels L predicted by the artificial neural network; and
  - backpropagating a loss gradient through the injective mapping g to update the artificial neural network.

18. A system for training an artificial neural network, the system comprising at least one non-transitory computer-readable medium comprising computer program instructions executable by at least one computer processor to perform a method, the method comprising:
- (A) receiving a plurality of images and a plurality of sets of corresponding instance labels, wherein each of the ground truth instance labels associates a region of an image with a specific instance of an object;
- (B) receiving a training objective, wherein the training objective specifies to minimize, for each pixel in an image, a divergence between (1) a distribution over instance labels produced by the artificial neural network and (2) a distribution resulting from applying an injective mapping of ground truth instance labels to neural network output labels to the distribution over instance labels determined from the corresponding ground truth instance labels, wherein the injective mapping is chosen for each image at every update step to minimize the divergence between (1) and (2); and
- (C) training the artificial neural network to minimize a loss function based on the plurality of images, the plurality of sets of corresponding ground truth instance labels, and the training objective, comprising:
  - determining an injective mapping g from ground truth instance labels T onto labels L predicted by the artificial neural network to minimize loss of the artificial neural network;
  - applying the injective mapping g during a forward pass of the artificial neural network, wherein the loss function after applying the injective mapping is permutation-invariant with respect to the labels L predicted by the artificial neural network; and
  - backpropagating a loss gradient through the injective mapping g to update the artificial neural network.

\* \* \* \* \*